Patented Feb. 2, 1937

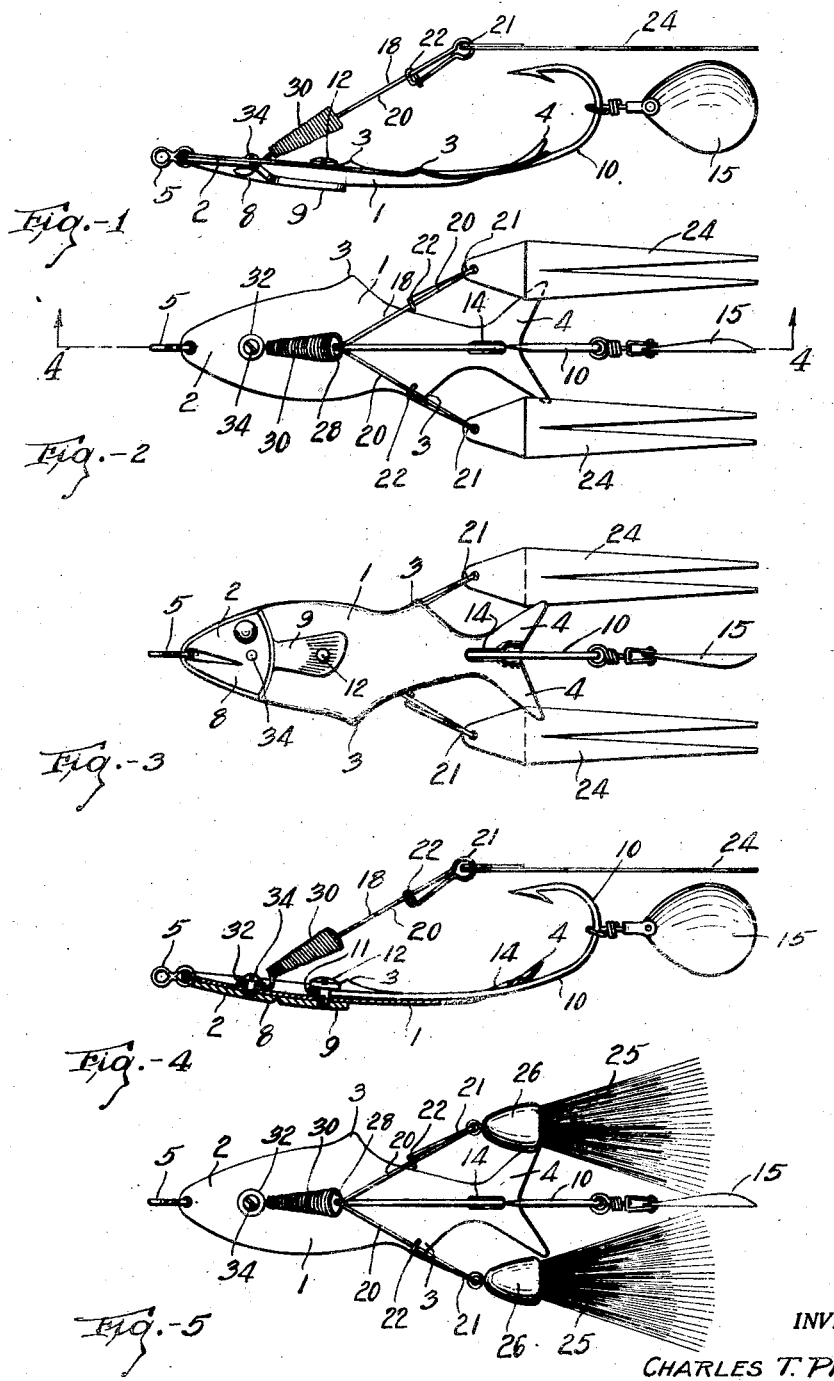

2,069,724

UNITED STATES PATENT OFFICE 2,069,724

COMBINATION SPOON AND LURE WITH WEED GUARD

Charles T. Pflueger, Akron, Ohio, assignor to The Enterprise Manufacturing Company, Akron, Ohio, a corporation of Ohio Application May 13, 1929, Serial No. 362,733

19 Claims. (Cl. 43—42)

The present invention relates to fish lures or artificial fishing bait and particularly to the manufacture of spoons or the like.

One object of the invention is to design an improved form of weed guard which is very flexible and pliable, being capable of being bent in any direction and to any extent without destroying the effectiveness of the weed guard. The weed guard is designed so that it will reassume its proper position with relation to the hook in order to perform its weed guarding function.

Another object of the invention is to provide improved means for attaching the weed guard to the spoon. By the construction here shown and described, the weed guard is attached to the spoon through the medium of a heavy metal plate which is mounted on the under or convex side of the spoon, which provides a strong anchorage for the weed guard. The metal plate also provides a secure point of attachment for the hook and by its weight operates as a keel to steady the action of the spoon during trolling.

The plate may be made of a contrasting metal which feature adds to the attractiveness of the spoon.

It is a further object of the invention to combine with the weed guard an easy and effective means for attachment of a lure in the form of strips of pork rind, bucktails, or feathers which are non-metallic and therefore buoyant and assist in keeping the spoon in its proper position during trolling.

In the drawing the preferred form of the invention is illustrated, but it will be appreciated that specific embodiments of the invention may depart therefrom without sacrificing the benefits thereof.

In the drawing,

Figure 1 is a side elevation of the spoon with pork rind attached thereto.

Figure 2 is a plan view thereof.

Figure 3 is a view looking at the under side of the spoon.

Figure 4 is a cross section on the line 4—4 of Figure 2; and

Figure 5 is a plan view of a spoon showing the method of attaching bucktails in the place of the pork rind.

In the drawing, the body portion of the spoon is designated by the numeral 1 which is concaved or dished on its long and short axes, as is usual in spoon constructions. The spoon may be in any desired form, that shown simulating a fish having a head 2, fin-like projections 3 and a tail 4. To the front end of the spoon is fastened the eye or loop 5 to which the line is attached. The body of the spoon is made of metal with a bright finish usually nickel plated, so that it will reflect the light rays. To the under side of the front of the spoon is secured a plate 8 preferably in the form of a fish head with an extension 9 similar in shape to a gill. This plate is usually of a metal, such, for example, as brass, contrasting in appearance from the body of the spoon and therefore adding to the attractiveness of the lure.

The plate 8 not only serves to decorate the spoon, but it also operates as a keel or ballast and by its weight tends to keep the head of the spoon down and the hook up during trolling. It also provides a firm anchorage for the weed guard and for the hook, as it provides an extra thickness of metal at the points where these parts are attached to the spoon, it being advisable to use screws which are threaded into the plate.

The hook is indicated at 10, the loop or eye 11 being attached to a central point in the concave side of the spoon by a screw 12 which is received in the body of the spoon and in the plate 8, usually in the extension 9 thereof. The stem of the hook passes through a slot 14 at the rear of the spoon, and on the rear of the hook is mounted the spinner 15.

The weed guard is shown at 18 and is constructed from two light, flexible divergent wires 20 which extend rearwardly and on opposite sides of the hook. The ends of the wires are formed with reversely bent loops 21, which terminate in catches 22 receivable over the wires to provide secure attaching means for the pork rind or other lures to be mounted on the weed guards. In the form of the invention shown in Figures 1 to 4 inclusive, the weed guards are supplied with slips of pork rind 24, which trail rearwardly from the weed guards at opposite sides of the hook. In Figure 5, the weed guards carry bucktails 25 mounted in cork holders 26. The lures are light and buoyant so that they assist materially in maintaining the upright position of the bait body. It is also to be noted that the location of the lures near the hook add to the killing properties of the bait.

While the invention includes the combination of the light, flexible weed guard with the buoyant lure as described, it also contemplates the mounting of the weed guards in any preferred manner. The invention also has as its object, however, the construction of a new form of weed guard which has added advantages of construction and operation as will be described.

In the form shown, the weed guards 20 are secured to or embedded within a plug 28, which is located within a tightly coiled spring holder or carrier 30. This carrier is preferably conical in form and is attached to the concave side of the spoon at the smaller end of the spring. This object is attained by locating the end of the spring beneath a washer 32 which is secured to the spoon by a screw 34 received in the spoon and in the plate 8.

The weed guard carrier or support is extremely flexible and permits the weed guard to move in any direction when striking an obstruction. The carrier will immediately right itself when the obstruction is passed and the weed guards will reassume their proper position with relation to the hook. The extreme flexibility and elasticity of the new form of weed guard make a practically indestructible and efficient weed guard, which is superior to other forms of guards heretofore known.

The combination of the various elements of the invention gives highly beneficial results in this art. The extreme flexibility or pliability of the weed guard maintains the bait in operative condition for longer periods and under more adverse conditions than possible with former types of guards. The construction of the weed guards with the snapped loops or eyes permits the fisherman to use the spoon in conjunction with pork rind and bucktails, the weed guards affording a ready means of removably attaching the detachable lure. The wobbling motion of the spoon or bait body in the water is not affected by the lure because of the extreme flexibility of the weed guards, and by the loose connection between the weed guards and the lure. The reinforcement or supplemental plate affords a firm anchorage for the weed guard and for the hook, in addition to its operation as a keel for the spoon and as a decorative adjunct. The attachment also permits easy replacement of the hook and the weed guard. The invention is not limited to a spoon body, as other forms of bait may be employed.

Other objects and advantages will be apparent to those skilled in this art.

What is claimed is:

1. A spoon comprising a concavo-convex spoon body, a plate attached to the convex side of the body, and a weed guard and attaching means for the weed guard anchored in the plate.

2. A spoon comprising a spoon body, a plate attached to the forward end of the body and operating as a keel therefor, an attachment for the spoon, and a screw for holding said attachment, the screw engaging in the plate.

3. A spoon comprising a spoon body, a plate attached to a portion of the body, a hook and a weed guard on the spoon and screws for holding the hook and weed guard in position, said screws engaging the plate.

4. An artificial bait comprising a spoon body of thin sheet metal, a reinforcing plate attached to the forward end of the body, an attachment, and a screw for securing said attachment on the body, said screw having threaded engagement with the plate.

5. In a fishing bait, a hook and a relatively broad metal bait body attached to the hook, a weed guard on the body, said weed guard extending rearwardly of the body, and a buoyant flexible trailing strip attached to the weed guard and trailing freely therefrom.

6. In a fishing bait, a bait body, a hook rigidly secured to the body, a weed guard on the body, said weed guard being formed of light flexible wire, and a strip attached to the weed guard, said strip being buoyant and trailing freely therefrom, and being located adjacent the hook.

7. In a fishing bait, a spoonlike bait body, a hook attached to the body, a weed guard also attached to the body, and a flexible strip on the end of the weed guard and trailing freely therefrom.

8. In a fishing bait, a spoon, and a weed guard attached to the spoon, said weed guard comprising a coil spring and a flexible wire extending from the coil spring in the plane of said spring axis.

9. In a fishing bait, a hook, and a weed guard associated with the hook, said weed guard comprising a coiled spring, a wire projecting from an end of the spring and constituting a weed guard, and fastening means at the end of the wire to receive a lure.

10. In a fishing bait, a spoon body, a hook on the body, a conical coiled spring attached to the body at its smaller end and extending toward the hook, and a weed guard on the spring.

11. In a fishing bait, a spoon body, a hook on the body, a conical coiled spring attached to the body at its smaller end and extending toward the hook, a weed guard on the spring and a lure attachable to the end of the weed guard and trailing freely therefrom.

12. In a fishing bait, a spoon body, a reinforcing plate and keel in the forward end of the body, a hook on the body and a screw for attaching the hook thereto, said screw passing into the plate, a coil spring, a screw for attaching the spring to the spoon, said screw passing into the plate, a flexible wire weed guard extending from the coil spring toward the hook, and a lure attached to the end of the wire.

13. In a fishing bait, a spoon body, a reinforcing plate and keel in the forward end of the body, a hook at the trailing end of the body, a coil spring, a screw for attaching the spring to the spoon, said screw passing into the plate, a flexible wire weed guard extending from the coil spring toward the hook, and a lure attached to the end of the wire.

14. In a fishing bait, a spoon body, a reinforcing plate and keel in the forward end of the body, a hook on the body and a screw for attaching the hook thereto, said screw passing into the plate, a coil spring, a screw for attaching the spring to the spoon, said screw passing into the plate, a flexible wire weed guard extending from the coil spring toward the hook, and a buoyant lure attached to the end of the wire and trailing freely therefrom.

15. An artificial bait comprising a relatively thin sheet metal body, means for attaching a line to the forward end of the body, a relatively heavy metal plate secured to the forward end of the body and adapted to prevent the body from spinning or planing out of the water, a hook rigidly attached to the body, and a buoyant lure attached to the body operating to maintain the upright position thereof.

16. An artificial bait comprising a relatively thin sheet metal body, means to prevent the body from rising from the water and to resist spinning of the body comprising a weighted keel attached to and confined to the forward end of the body, a hook carried by the body and a pair of buoyant lures connected to the body and trailing freely at each side of said hook.

17. In a fishing bait, a hook, a flexible weed guard associated with the hook and having a free end extending toward and shielding the hook, and a flexible strip of rind or the like carried solely by the weed guard and trailing freely behind the hook.

18. An artificial bait comprising a relatively thin sheet metal body, a hook on the body, means to maintain the body in operative position with the hook upright, comprising a weighted keel on the forward end of the body, a spinner or the like slidably mounted in the bend of the hook, and a pair of buoyant lures connected to the body and trailing freely at each side of said hook.

19. A lure comprising an elongated plate curved upwardly adjacent its rear end and terminating in a rearwardly extending portion having an aperture therein, a hook having the curved portion of its shank projecting through said aperture and having the straight portion of its shank extending longitudinally forwardly of said body at the upper side thereof, a weight carried by the forward end of said body, and means securing said weight to said body and in addition securing the end of said hook shank in operative relation to said body.

CHARLES T. PFLUEGER.